United States Patent [19]

Hunkeler

[11] 3,971,293

[45] July 27, 1976

[54] ANTI-BACKLASH MECHANISM FOR GENERATING TRAIN OF GEAR CUTTING MACHINE

[75] Inventor: Ernst J. Hunkeler, Fairport, N.Y.

[73] Assignee: The Gleason Works, Rochester, N.Y.

[22] Filed: Apr. 30, 1975

[21] Appl. No.: 572,998

[52] U.S. Cl. .................................. 90/5; 51/95 GH; 51/105 HB; 74/409; 90/3
[51] Int. Cl.² .......................................... B23F 9/10
[58] Field of Search .................................. 90/3, 4–8; 51/95 GH, 105 HB; 74/409

[56] References Cited
UNITED STATES PATENTS

| | | | |
|---|---|---|---|
| 1,516,477 | 11/1924 | Schofield | 90/4 |
| 1,570,372 | 1/1926 | Buckingham | 90/4 |
| 3,099,939 | 8/1963 | Haase et al. | 90/3 |
| 3,453,931 | 7/1969 | Campbell | 90/4 |
| 3,464,312 | 9/1969 | Takahashi et al. | 90/5 |

OTHER PUBLICATIONS

"18 Ways to Control Backlash in Gearing", Fredrick Gutman, *Product Engineering*, Oct. 26, 1959, pp. 71–75.

*Primary Examiner*—Othell M. Simpson
*Assistant Examiner*—Fred A. Silverberg
*Attorney, Agent, or Firm*—Morton A. Polster

[57] ABSTRACT

The invention overcomes undesirable backlash effects in gear generators which cut gears by climb milling (i.e., with cutter blades rotating in the same direction as the work), these undesirable backlash effects being initiated by the intermittent cutting torques that tend to move the work momentarily ahead of the generating drive train as each blade is in the cut. Instead of a conventional spindle brake to oppose the cutting torques, an auxiliary motor in proximity to the work spindle end of the generating train applies torque to the train in the same direction as it is being driven by the main drive motor, and in the same direction as the cutting torques, thereby maintaining tightness in that portion of generating train which controls work spindle rotation by keeping the train gears with their "coasting" sides in contact rather than trying to keep their "driving" sides in contact.

5 Claims, 3 Drawing Figures

3,971,293

ANTI-BACKLASH MECHANISM FOR GENERATING TRAIN OF GEAR CUTTING MACHINE

ANTI-BACKLASH MECHANISM FOR GENERATING TRAIN OF GEAR CUTTING MACHINE

The present invention relates to generators for cutting gears with multi-bladed cutters and, more particularly, to the mechanical gear train interconnecting the cutter and work spindles of such machines.

BACKGROUND

In the cutting of spiral bevel or hypoid gears, if the direction of cutter rotation is selected such as to produce the cutting action commonly known as climb milling, the torque load imposed on the work and work spindle by each individual cutting blade is in the direction of the work rotation. This means that as each cutter blade enters the cut, it tends to drive the work spindle rotation momentarily ahead relative to the generating gear train which normally rotates the spindle in timed "generating" relation to the rotation of the cutter-supporting cradle. This condition tends to cause a repetitive winding and unwinding in the generating train such as to take up backlash through the train first in one direction, then the other. This causes rattle and vibration in the drive which is transmitted to the work spindle. The result is unevenness in the cut, poor finish and cutter life, and even cutter breakage or machine damage can result.

In the past, it has been customary to apply a constant brake load to the work spindle, in an attempt to maintain sufficient torque load on the spindle at all times so as to keep the generating train backlash always taken up in the normal driving direction. But work spindle brakes are subject to uneven action and wear, requiring frequent readjustment and they can be a continuing maintenance problem. The inconsistency and maintenance of such brakes are particularly troublesome in roughing operations where heavy cutter loads and corresponding heavy brake loads are involved.

SUMMARY OF THE INVENTION

The prior art problems arising from backlash in the drive train are solved by this invention in an unconventional and economical manner. Instead of depending upon work spindle brakes to try to keep the contact in the generating train always on the normal driving side, a secondary torque motor is connected to the train in such a way as to maintain the contact on the opposite or normal "coasting" side of the teeth throughout the usually long part of the train which drives the work spindle. In the embodiment shown, the secondary motor is connected to the generating train worm at a point beyond the work spindle drive wheel. It thus acts to drive the train from the work spindle worm back toward the conventional torque input end. This secondary motor is reversibly controlled to drive in directional synchronism with the main drive of the generating train. Both drives are driving the train simultaneously, and both operate to apply torque input in the same direction to the train. When the cutter is operating in the climb milling manner, the secondary motor applies torque to the train in the same direction as the cutter blades try to drive the train. This secondary motor torque remains effective whether cutting blades are in or out of the cut, and this torque insures that the drive train teeth stay in contact on what would normally be the coasting side of the teeth.

DETAILED DESCRIPTION OF INVENTION

Figure 1:
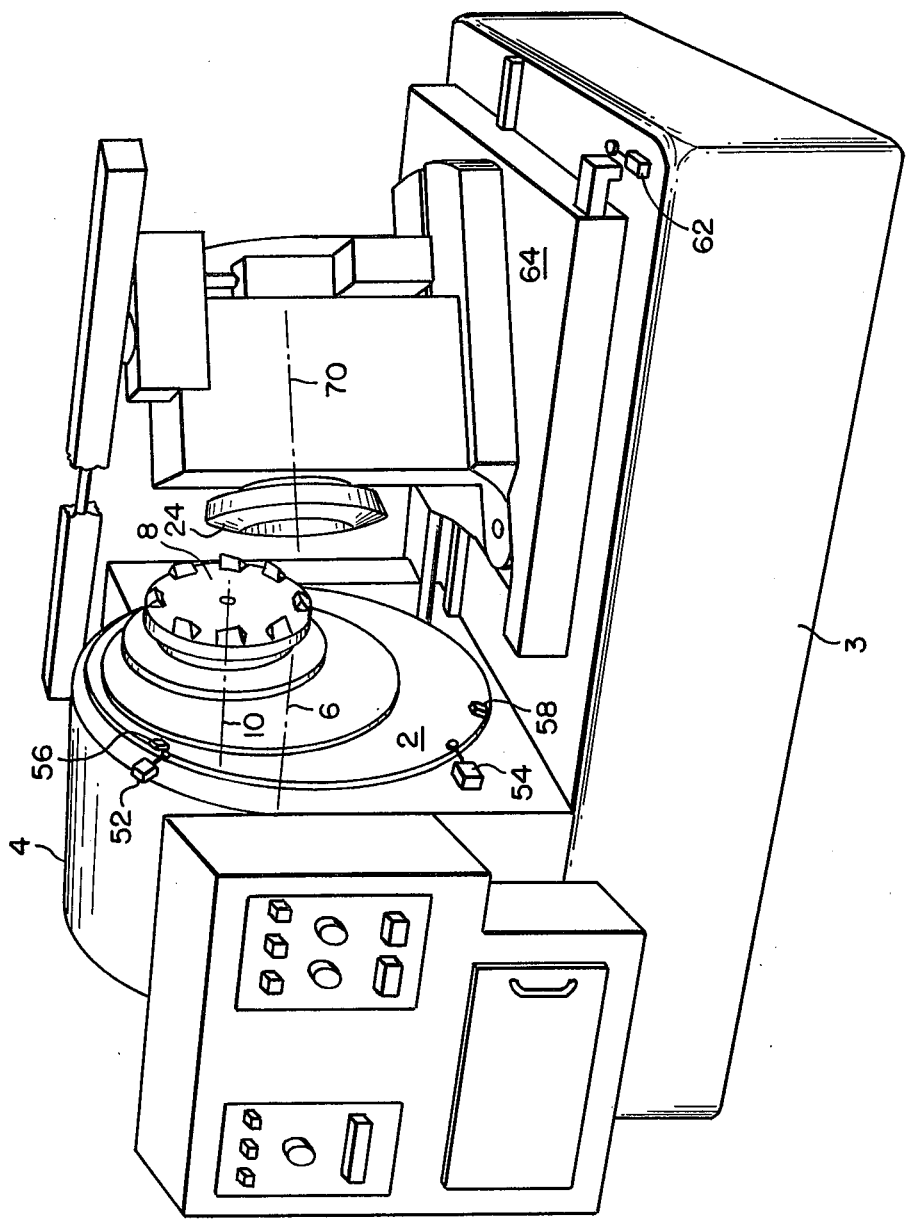
FIG. 1 is an isometric view of a spiral bevel and hypoid gear generator improved according to the invention.
Figure 2:
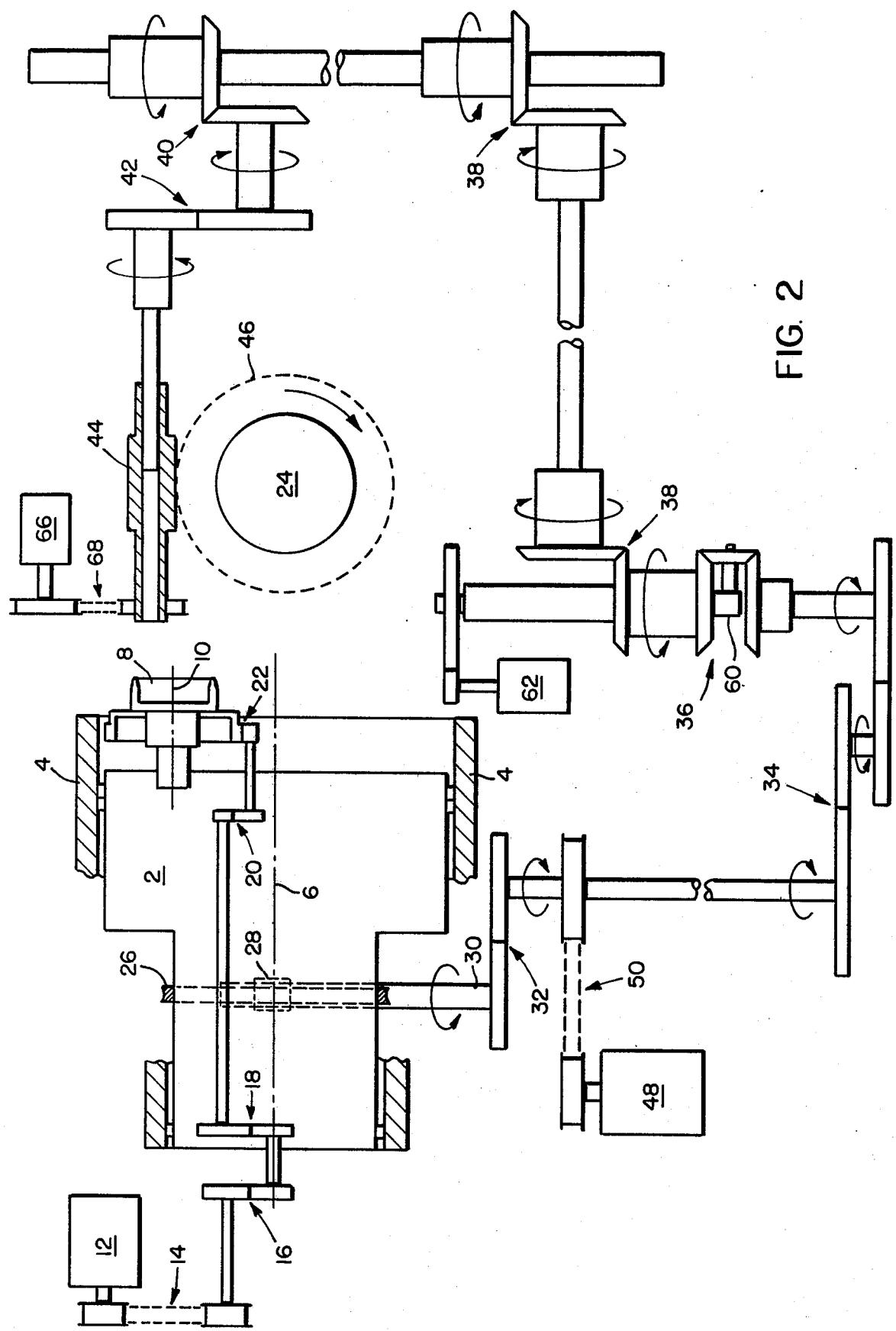
FIG. 2 shows a partial drive diagram of the machine of FIG. 1, including the main drive to the generating train and the secondary torque motor of the invention.

In FIG. 2 is shown a generally typical drive diagram of a spiral bevel and hypoid generator as illustrated in FIG. 1. A cradle 2 is rotatably mounted in a cradle housing 4 for rotation about a cradle axis 6. Rotatably mounted within cradle 2 is the face mill cutter 8 for rotation on a cutter axis 10 eccentric to the cradle axis. In the embodiment shown, the cutter is driven by a driving motor 12 separate from the power source for rotating the cradle, although in most machines of this general type the same power source serves to rotate the cradle and the cutter. In the arrangement shown, the cutter is driven from motor 12 through a pulley drive 14, gearing 16, 18, 20 and 22.

The cradle is connected to a work spindle 24, which holds the gear being cut and rotates it in timed relation to rotation of the cradle by means of a generating train of gearing. This latter train includes a cradle worm wheel 26, affixed to the cradle, and a worm 28 rotatably mounted in the cradle housing and keyed for rotation to shaft 30. The generating train further comprises gears 32, ratio-of-roll change gears 34, an indexing differential 36, bevel gear pairs 38 and 40, index change gears 42, a work spindle drive worm 44 and worm wheel 46, the latter being affixed for rotation to the work spindle.

Connected to the generating train, at a junction intermediate the work spindle and cradle, is a reversible main drive motor 48 connected to the train through pulley drive 50 to rotate the train in either direction. Motor 48 may be a direct current electric or a hydraulic type with suitable reversing apparatus, not shown. The reversing of motor 48 may be initiated during the operating cycle by limit switches 52 and 54, actuated by cams 56 and 58 (See FIG. 1) adjustably positioned on the cradle in a known manner, such as to control the end points of the cradle oscillation. The end points of oscillation of the work spindle are thereby also controlled for each oscillating cycle dependent upon the ratio-of-roll gearing 34 and the indexing gearing 42. At the end of each oscillating cycle the spider 60 of index differential 36 can be rotated by a suitable known indexing device, shown at 62. The index rotates through a controlled number of turns to produce a controlled increment of angular rotation of the work spindle relative to the cradle, generally one angular pitch of the workpiece. The index device might be of a Geneva type, cam actuated by mechanism operatively connected to the generating train, or it might comprise a separate motor drive, intermittently actuated by one of the cradle limit switches 52, 54 or by a limit switch 62 (FIG. 1) actuated by withdrawal of the slide 64 which supports the work spindle on the machine base 3.

As previously noted, prior art work spindles generally have been equipped with braking devices to provide a constant drag torque load on the work spindle. These brakes, although generally effective, have presented serious problems as noted above.

This invention comprises an additional or secondary drive to the generating train in the form of a torque motor 66, shown connected, by pulley-and-belt 68, to the generating train through work spindle worm 44, being connected at the end of the worm opposite the remainder of the train. However, the connection could as well be made, if convenient, between worm 44 and index gears 42. The principal requirement is a connection of the secondary torque motor into the train at a junction in proximity to the work spindle end of the train either just ahead of or behind the drive worm. The secondary motor, when energized, applies torque to drive the train in the same direction of rotation as it is driven by main motor 48.

To indicate the action of the secondary motor in maintaining the train free of backlash during a generating roll, reference will now be made to FIG. 3 in which, cradle axis 6 and work spindle axis 70 are shown schematically aligned for convenience. (In reality, when cutting spiral bevels these axes usually intersect at the root angle of the work being cut.) Also, face mill cutter 8 is shown with its axis 10 in typical relation to the workpiece. The view is from the back of cradle 2, i.e., such as to view the cutter from its back, or non-cutting, face, looking toward the teeth of a workpiece 72 mounted on the front of work spindle 24.

Figure 3:
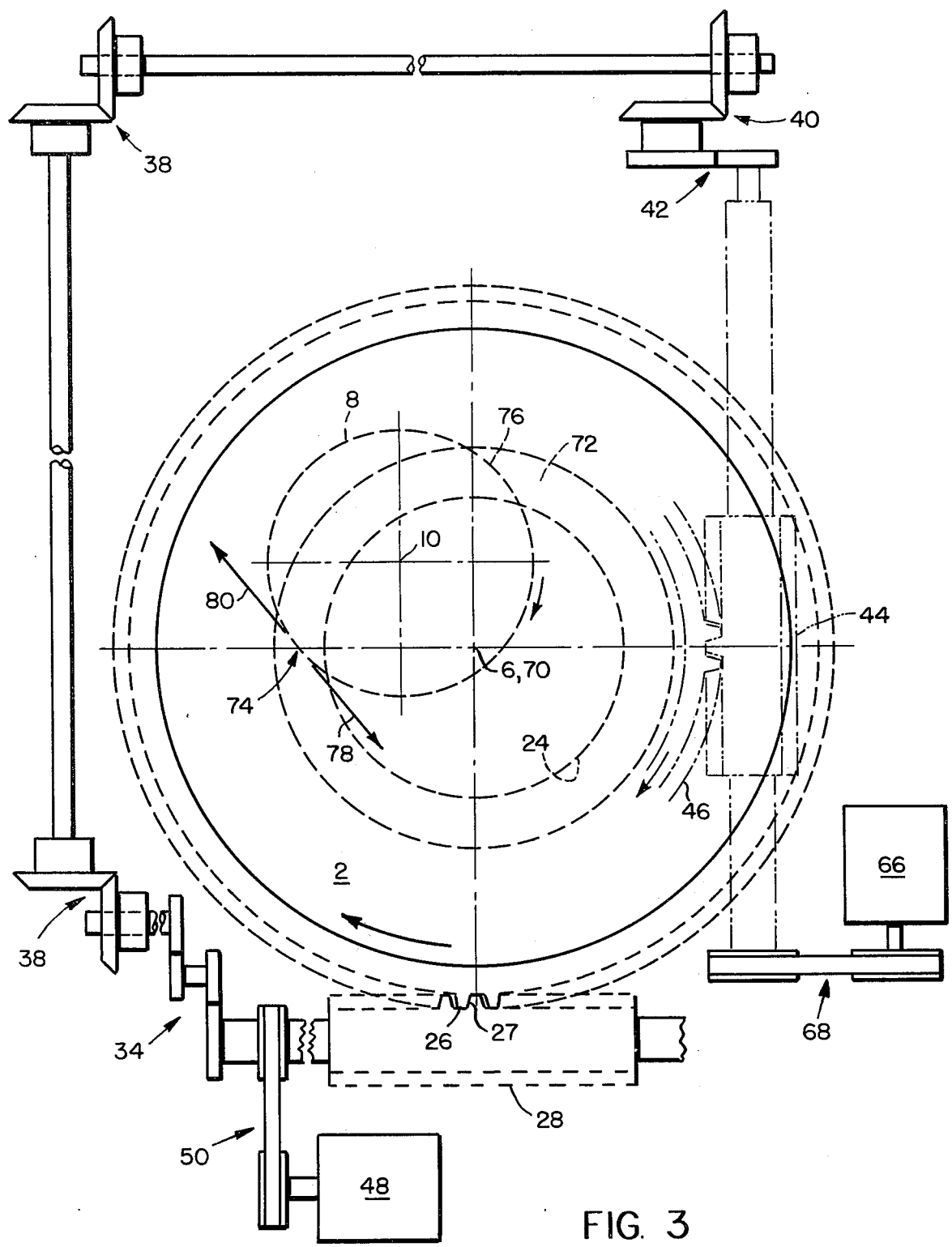
FIG. 3 is a schematic view of the work spindle, the cutting tool, the tool carrying machine cradle, and the drive train, showing rotational and torque directions.

Assuming a typical "climb milling" operation, teeth are cut into workpiece 72 on the "uproll", i.e., with both cradle 2 and workpiece 72 being rotated clockwise as viewed in FIG. 3. A right hand cutter 8, which also rotates clockwise in this view, generate-cuts workpiece 72 to produce a right hand gear. By virtue of the root angle setting (not shown in FIG. 3), cutter 8 engages workpiece 72 at location 74 and not at location 76.

As each successive cutting blade engages the workpiece, there is a reaction to the cutting force in the direction of arrow 78 such as to oppose rotation of cradle 2 and thus keep worm wheel 26 engaged in normal contact with the driving side 27 of cradle worm 28. This tends to maintain all of the gearing of the generating train between drive motor 48 and worm wheel 26 engaged on the normal driving side. Therefore, the reactive force represented by arrow 78 tends to maintain "tightness" in the cradle-driving portion of the train.

Contrarily, the force of each blade cutting on workpiece 72 produces a torque in the direction of arrow 80 which acts on work spindle 24 and tends to drive spindle worm wheel 46 and its worm 44 in the forward direction. Assuming, for a moment a conventional drive train without secondary torque motor 66, the effect of driving worm 44 in the forward direction is to unload the normal driving side of the train, that is, it causes the teeth of the various driven gears in the train to move ahead out of engagement with driving side of the teeth of each respective drive gear. Such movement is possible because of the normally present "backlash" clearance that exists in all conventional gear pairs. Then, under the same assumed circumstances, as each blade emerges from the cut moments later, the cutting torque (arrow 80) disappears and drive to the work spindle is returned to motor 48 as the teeth of each gear pair in the train return into "drive side" engagement, but only to move away again as the next cutter blade engages the work. This constant fluctuation in load direction and magnitude produces a repetitive wind-unwind in the generating train, permitting backlash effect and resulting in rattle and vibration which, in turn, results in uneven cutting damaging to both the workpiece and the cutter.

By adding secondary torque motor 66, the invention herein unconventionally overcomes the backlash effect by applying a constant torque to worm 44 in the same forward direction that worm 44 is normally urged by the cutting torque (arrow 80) produced by each successive cutting blade. The size of motor 66 is selected so that its operating torque is sufficient to drive work spindle 24 as well as the entire generating drive train as far back as the driven pulley of belt drive 50, but its torque is not great enough to also drive cradle 128 or to over-drive main motor 48. That is, while the torque of secondary motor 66 is not sufficient to dominate the entire machine drive train, it is sufficient to maintain in "coast side" engagement at all times that portion of the drive train between worm 44 and generally as far back as the driven pulley of the drive 50 from main drive motor 48. Since this portion of the gear train remains in contact on the same sides of the teeth of each mesh, the backlash effect is eliminated.

Attention is called to the fact that, as noted above, in the remaining portion of the drive train, between main drive motor 48 and spindle 2, backlash effect is not a problem. Therefore, the just-described unconventional use of a secondary motor effectively results in tightness throughout the entire drive train.

It will be appreciated that the utility of the invention is not confined to bevel and hypoid gear generators of the type shown, but rather the invention is equally applicable to any gear generating machine where intermittent cutting action results in the type of backlash problem described.

What is claimed is:
1. In a gear generator having
   a. a rotatable work-holding spindle,
   b. a cutter spindle mounted in a rotatable cradle,
   c. a generating train interconnecting the work spindle and cradle for rotating them simultaneously in timed relation, and
   d. first drive means,
      i. connected to the generating train at a first junction intermediate said work spindle and cradle,
      ii. for driving said train in at least one direction,
   the improvement comprising:
   e. second drive means
      i. for simultaneously driving the train in the same said direction,
      ii. said second drive means being connected to the generating train at a second junction remote from said first junction and in proximity to the work spindle end of said train.

2. A generator according to claim 1 wherein said first and second drive means comprise, respectively, first and second reversible motors.

3. A generator according to claim 1 wherein said second junction is between the first junction and the work spindle.

4. A generator according to claim 1 wherein the work spindle is between said first and second junctions.

5. A generator according to claim 2 wherein said second reversible motor produces less torque than the first motor.

* * * * *